United States Patent [19]

Nakagaki et al.

[11] 4,241,456
[45] Dec. 23, 1980

[54] REMOTE-CONTROLLED RECEIVER

[75] Inventors: Harushige Nakagaki; Shigeki Inoue, both of Toyokawa, Japan

[73] Assignee: Hitachi, Ltd., Japan

[21] Appl. No.: 68,564

[22] Filed: Aug. 22, 1979

[30] Foreign Application Priority Data

Aug. 30, 1978 [JP] Japan ................. 53/104928

[51] Int. Cl.$^3$ ............................................. H04B 9/00
[52] U.S. Cl. .................................. 455/603; 358/194.1
[58] Field of Search ...................... 455/603; 358/194.1

[56] References Cited
U.S. PATENT DOCUMENTS

| | | | |
|---|---|---|---|
| 3,866,177 | 2/1975 | Kawamata | 455/603 |
| 3,928,760 | 12/1975 | Isoda | 455/603 |
| 4,036,762 | 7/1977 | Troetscher | 455/603 |
| 4,090,216 | 5/1978 | Constable | 358/27 |
| 4,091,272 | 5/1978 | Richter | 455/603 |
| 4,156,134 | 5/1979 | Minner | 455/603 |

*Primary Examiner*—Howard W. Britton
*Attorney, Agent, or Firm*—Craig and Antonelli

[57] ABSTRACT

An infrared remote-controlled receiver of the type comprising an infrared sensing element for receiving a signal transmitted by means of infrared radiation, and an amplifier for amplifying the signal detected by the sensing element, is further provided with detecting means for detecting the ambient luminance of the receiver (an interference signal) and gain control means for supplying the output signal of the detecting means to the amplifier to control its gain in accordance with the ambient luminance of the receiver.

10 Claims, 18 Drawing Figures

REMOTE-CONTROLLED RECEIVER

BACKGROUND OF THE INVENTION

1. Field of the Invention

The invention relates to receivers of the type incorporating a remote control system utilizing infrared radiation.

2. Description of the Prior Art

An infrared remote control system is known in the art in which the rectangular intermittent infrared signal transmitted from an infrared remote control transmitter is received by the light receiving element of an infrared remote-controlled receiver, whereby the light current flowing in the light receiving element is amplified and detected by an amplifier and an envelope detector through a resonance circuit and the pulse width of the resulting pulse signal is determined by the following pulse width detecting means to generate a control signal in response to the output signal of the detecting means.

A disadvantage of this type of systems is that an infrared remote-controlled receiver used with such system is extremely susceptible to interference illumination such as an incandescent lamp or sunlight.

SUMMARY OF THE INVENTION

It is the object of the invention to provide a remote-controlled receiver which is less susceptible to the effect of such interference illumination as incandescant lamp or sunlight and which can be operated by a remote control transmitter from a distance that is long enough.

In accomplishing these and other equally desirable objects, the remote-controlled receiver provided in accordance with the present invention includes detecting means for detecting the light intensity of interference illumination and gain control means for supplying the output signal of the detecting means to the amplifier of a receiving circuit to control the gain of the amplifier in a manner that the gain is decreased with an increase in the intensity of the interference illuminating light.

DESCRIPTION OF THE PREFERRED EMBODIMENTS

To afford an understanding of the principle of the invention, an explanation of prior art will be made first with reference to the block diagram of a prior art infrared remote control system shown in FIG. 1. In the Figure, numeral 100 designates a remote control transmitter, 110 a remote control actuation unit for generating remote control signals, and 120 a switching transistor circuit connected to an output terminal 110a of the actuation unit 110 and responsive to the remote control signal waveform from the remote control actuation unit 110 to perform switching and the transistor circuit comprises switching transistors 121 and 122 and resistors 123, 124, 125 and 126. Numeral 130 designates a group of light emitting diodes (LED) connected to the output of the switching transistor circuit 120 and responsive to the output current of the transistor circuit 120 to produce an infrared radiation, 140 a choke coil connected in series with the LED group 130, and 150 a power source. With this transmitter, when the switch corresponding to the desired function is turned on in the actuation unit 110, a rectangular wave current of a fixed frequency (carrier wave $f_o$) is intermittently produced at the output terminal 110a as shown in FIG. 2a and in response to this output a current having a waveform with slower rise and fall (the maximum value is ip) as shown in FIG. 2b is supplied to the LED group 130. In FIG. 2a, the time t=0 indicates the time that the switch associated with the desired function was turned on. The slower rise and fall in the waveform of the current flowing to the LED group 130 is due to the fact that the harmonic component in the rectangular wave ($f_o$) is attenuated by the action of the chock coil 140. The choke coil 140 is provided to attenuate the harmonic component in the carrier wave $f_o$ and thereby to prevent interference effects on the AM radios due to the harmonic component in the carrier wave $f_o$. The carrier wave $f_o$ is usually set to 20 to 50 kHz which are outside the audio frequency band.

Numeral 200 designates an infrared remote-controlled receiver for receiving the infrared light radiated from the LED group 130 in the transmitter 100. Numeral 210 designates a light receiving element, such as a photodiode which is responsive to the infrared light to supply a light current as shown in FIG. 2c. Numeral 220 designates a resonance circuit comprising a coil 221, a resistor 222 and a capacitor 223 for detecting the small current flowing in the light receiving element 210, and 230 and 240 respectively designate an AC amplifier for amplifying the light current passed through the resonance circuit 220 and a detection circuit for effecting envelop detection on the carrier wave $f_o$ to generate intermittently at its output terminal 240a an detection output consisting of long-duration and short-duration pulses $T_o$ and $T_I$ synchronized with the output of the actuation unit 110 in the transmitter 110 as shown in FIG. 2d. Numeral 250 designates a power source.

With this system, the detection of the correspondence between the transmitted remote control signal and the controlled equipment function can be easily accomplished by detecting the relative position of the short-duration pulse $T_I$ in the pulse train. For example, if the timing of generating the carrier wave for the time duration $T_I$ upon the depression of operating switch (t=0) is determined in ordered relation with respect to the timing of generating the carrier wave for the time duration $T_o$ for each of the plurality of operating switches in the actuation unit 110 and if a position detector for the pulses $T_I$ is provided behind the output terminal 240a of the detection circuit 240 in the receiver, it is possible to associate each of the controlled equipment functions with corresponding one of the remote control signals (the operating switches).

Figure 3A:
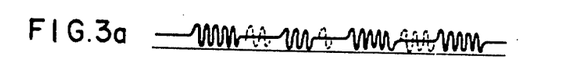
FIGS. 3a and 3b are diagrams showing the receiver detection output waveforms for an interference illumination.
Figure 3B:
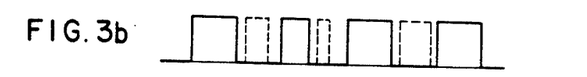
Figure 4:
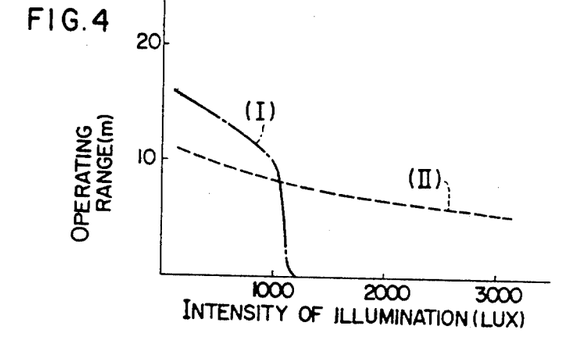
FIG. 4 is a remote control operating range characteristic diagram for the circuit of FIG. 1.

With this remote control transmit-receive system, if any strong light source such as an incandescent lamp or sunlight is present in the vicinity of the light receiving element 210 of the receiver 200, the distance from which the receiver can be controlled by the remote operation will be decreased extremely. This is due to the fact that the random noise generated by the incandescent lamp or sunlight causes a flow of light current in the light receiving element 210 and the frequency component of the current which is equal to the carrier wave $f_o$ is detected by the resonance circuit 220 and delivered through the AC amplifier 230 and the detection circuit 240, thus making the output undistinguishable from the remote control signal and thereby making it impossible to effect the control. This situation is shown in FIGS. 3a and 3b. FIG. 3a shows the waveform of the current supplied to the resistor 222 of the resonance circuit 220 and FIG. 3b shows the waveform generated at the output terminal 240a of the detection circuit 240. In FIGS. 3a and 3b respectively corresponding to FIGS. 2c and 2d, the solid lines indicate the output waveforms of the remote control signal or the detected infrared light from the LED group 130 of the transmitter 100 and the broken lines indicate the output waveforms due to the intereference illumination such as an incandescent lamp or sunlight. It will be seen from FIG. 3b that the output of the detection circuit 240 is disturbed considerably by the interference illumination so that the output cannot be distinguished from the proper remote control signal output and the operating range or distance of remote control is decreased, thus eventually making the control impossible. FIG. 4 shows the results of the actual measurement of the relation between the intensity of interference illumination and the operating range of remote control. In the Figure the characteristic (I) represents the case where the gain of the AC amplifier 230 in the receiver 200 was set to 86 dB and it will be seen that the remote control range (the cotnrollable range) decreases extremely when the intensity of illumination exceeds 1000 luxes and that the control is made impossible at around 1100 luxes.

Figure 1:
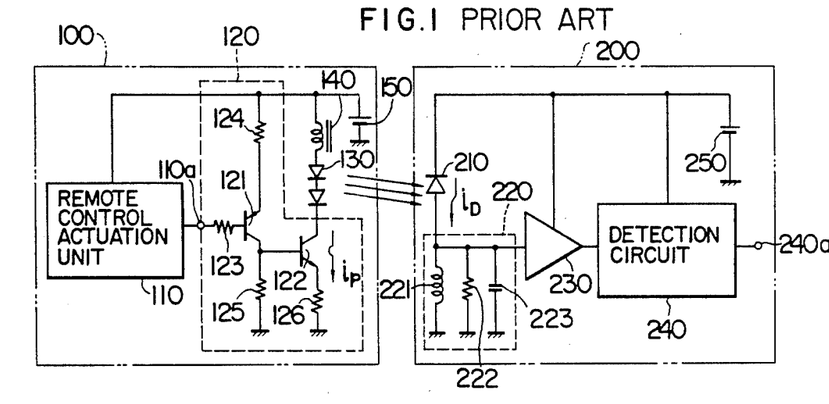
FIG. 1 is a block diagram showing a prior art remote control transmit-receive system utilizing infrared radiation.
Figure 2A:
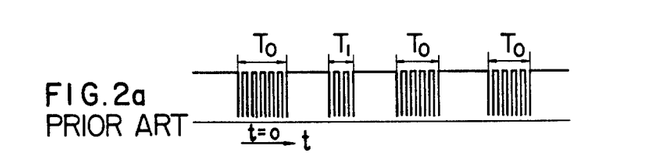
FIGS. 2a, 2b, 2c and 2d show the waveforms generated at various points in the circuit of FIG. 1 for explaining its operation.
Figure 2B:
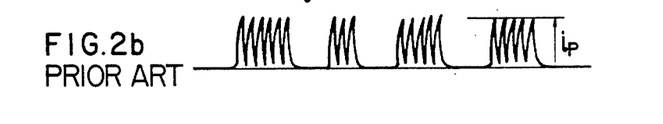
Figures 2C, 2D:
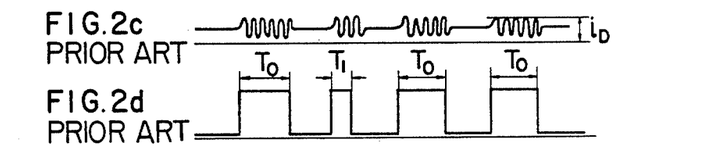

It will thus be seen from the foregoing that the prior art remote-controlled receiver of FIG. 1 is extremely susceptible to such interference illumination as incandescent lamp or sunlight. This may be attributed to the fact that the resonance circuit 220 constitutes the first stage of the receiver 200. More specifically, the range of remote control is greatly reduced by the detection of the carrier wave component of an interference illumination random noise by the resonance circuit 220. However, even if the resonance circuit 220 is eliminated, there still exists a risk of a phenomenon arising in which the remote control range characteristic is deteriorated by such an interference illumination over the characteristic (I) of FIG. 4. The reason is that if the coil 221 and the capacitor 223 are eliminated from the circuit of FIG. 1 leaving only the resistor 222 as the load, the DC light current $i_D$ in the light receiving element 210 will be increased with the intensity of interference illumination such as an incandescent lamp or sunlight, thus increasing the voltage drop across the resistor 222. When the voltage drop across the resistor 222 increases, the operating voltage of the light receiving element 210 gradually approaches the voltage of the DC voltage source 250 and the increasing intensity of illumination eventually causes it to attain the voltage of the DC voltage source 250, thus cutting off the light receiving element 210 (photodiode) and thereby making the reception impossible.

The resonance circuit can be considered as essential for this system in that if the first stage of the receiver is formed by the resonance circuit, the current components lower in frequency than the carrier wave $f_o$ will be attenuated by the coil 221 and the current components of frequencies higher than $f_o$ will be attenuated by the capacitor 223, thus preventing any variation in the DC operating point of the light receiving element 210 due to the interference illumination.

While the deficiencies of the prior art remote control transmit-receive system shown in FIG. 1 have been described, in order to make the system less susceptible to illumination interferences and prevent any sharp decrease in the range of remote control, it is only necessary to arrange so that the interference signal amplified by the AC amplifier 230 is prevented from exceeding the threshold level (input sensitivity) of the detection circuit 240 and one possible way will be to decrease the voltage gain of the AC amplifier 230. However, if the voltage gain of the AC amplifier 230 is decreased, it will of course deteriorate the detection sensitivity for infrared radiation or remote control signals, thus giving rise to a problem of decreased range of remote control. This situation is shown by the characteristic (II) in FIG. 4. The characteristic (II) represents the case where the voltage gain of the AC amplifier 230 was set to 80 dB or a decrease of 6 dB as compared with the characteristic (I), and it will be seen that while the range of remote control was not decreased greatly with increase in the intensity of illumination as in the case of the characteristic (I), the initial range without any illumination interference was decreased about 40%.

The range of the characteristic (II) without illumination interference can be made equal to that of the characteristic (I) only by increasing the radiation intensity of infrared light in the transmitter. This requires an increase in the number of light emitting diodes or an increase in the amount of current flow to the light emitting diodes and these measures are disadvantageous in that not only the construction of the transmitter is complicated but also the consumption of power from the DC voltage source 150 consisting of a dry cell is increased.

In short, while, in the prior art system of FIG. 1, the range of remote control can be increased by increasing the voltage gain of the AC amplifier of the receiver, essentially there is a design limitatin to the voltage gain of the AC amplifier in view of the fact that such interference illumination as incandescent lamp or sunlight causes a sharp decrease in the range of remote control. After all, only means to increase the range is to increase the number of light emitting diodes or increase the amount of current flow to the light emitting diodes so as to increase the radiation intensity of infrared light on the transmitter side.

In view of these circumstances, the inventors have discovered that the desired range of remote control will be ensured without any complication of the transmitter if a receiver is realized which satisfies the characteristic (I) of FIG. 4 when the intensity of interference illumination is low and which satisfies the characteristic (II) of FIG. 4 for the increasing intensity of illumination.

Figure 5:
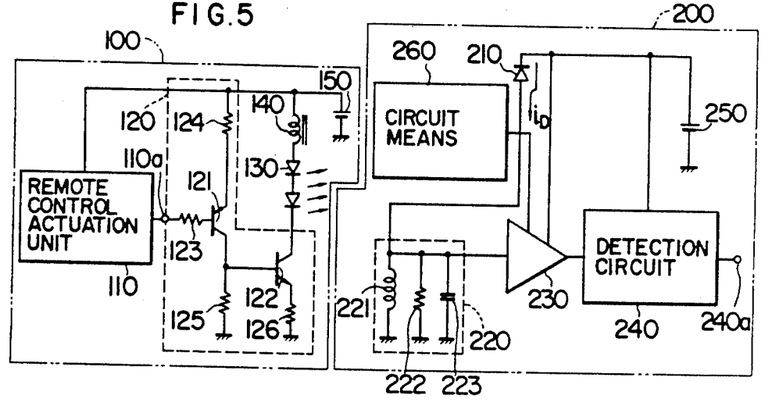
FIG. 5 is a block diagram showing an embodiment of a remote-controlled receiver according to the invention.
Figure 6:
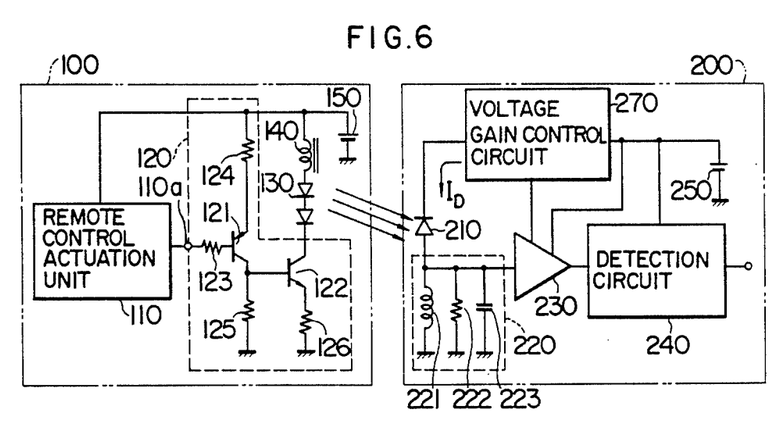
FIG. 6 is a block diagram showing another embodiment of the invention.

FIGS. 5 and 6 are block diagrams showing embodiments of the invention which overcome the previously mentioned deficiencies in the prior art. In the Figures, the same reference numerals are employed for the component parts which are identical with the counterparts of FIG. 1. In the improved circuit of FIG. 5, numeral 260 designates circuit means disposed in the vicinity of the light receiving element 210 of the receiver 200 and connected to the amplifier 230. The circuit means 260 comprises a light signal detecting circuit for detecting an interference illumination, such as an incandescent lamp or sunlight in the vicinity of the receiver 200 and a voltage gain control circuit adapted for swtiching in response to the light signal flowing in the light signal detecting circuit whereby the voltage gain of the amplifier is decreased automatically when a strong interference illumination is incident upon the light signal detecting circuit. The improved circuit of FIG. 6 differs from the circuit of FIG. 5 in that the light receiving element 210 for detecting infrared remote control signals also serves the function of the light signal detecting circuit and a DC light current $I_D$ caused by an interference illumination is detected by a voltage gain control circuit 270 including light current detecting means and connected to the light receiving element 210, the AC amplifier 230 and the power source 250, whereby the voltage gain of the amplifier 230 is automatically controlled.

Figure 7:
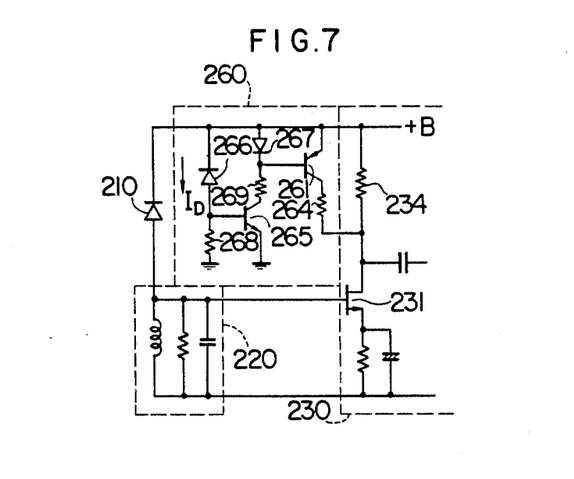
FIG. 7 is a circuit diagram for the embodiment of FIG. 5.

The operating principle of the invention will now be described with reference to FIGS. 7 and 8 respectively showing in detail the specific embodiment circuits of FIGS. 5 and 6. In FIG. 7, numeral 266 designates a photodiode forming the light signal detecting circuit and its cathode is connected to the light receiving element 210 and the power supply $+B$. The anode of the diode 266 is grounded through a resistor 268. Numerals 261 and 265 designate switching transistors forming the voltage gain control circuit, and 267 a diode. The transistor 265 has its base connected to the anode of the photodiode 266, its collector connected to the power supply $+B$ through a resistor 269 and the cathode and anode of the diode 267 and its emitter directly grounded. The transistor 261 has its base connected to the cathode of the diode 267, its emitter connected to the power supply $+B$ and its collector connected through a resistor 264 to the drain D of an FET transistor 231 in the AC amplifier 230.

With this circuit construction, when the light current $i_D$ (DC) caused by an interference illumiantion flows to the photodiode 266, a voltage drop is caused across the resistor 268 and the transistor 265 is turned on by the voltage drop. When the transistor 265 is turned on, the diode 267 and the transistor 261 are also turned on. When the transistor 261 is turned on, the resistor 264 is connected in parallel with a load resistor 234 of the FED transistor 231. When this occurs, the load resistance value of the transistor 231 is decreased and its voltage gain is also decreased. The operating point with respect to the intensity of interference illumination can be selected as desired depending on the value of the resistor 268.

The embodiment of FIG. 8 will now be described. In the Figure, numeral 271 designates a switching transistor forming a part of the voltage gain control circuit 270 and the transistor 271 has its base connected to the cathode of the light receiving element 210 consisting for example of a photodiode. The base of the transistor 271 is also grounded through a capacitor 272 and the base is further connected to the power source 250 through a resistor 273. The emitter of the transistor 271 is directly connected to the power source 250 and its collector is connected through a resistor 274 to the drain D of the field effect transistor 231 forming the first stage of the AC amplifier 230. The transistor 231 has its gate G connected to the anode of the photodiode 210 through the resonance circuit 220 and its source S connected to the ground through a parallel circuit of a resistor 232 and a capacitor 233. The drain D of the transistor 231 is connected to the power source 250 through the load resistor 234 and the drain D is also connected to the following amplifying transistor 236 through a capacitor 235. Since the other portions have no direct bearing on the invention, these portions are only shown in the Figure and will not be described in detail.

With the circuit construction described above, when the photodiode 210 is lighted by an interference illumination, a DC light current $I_D$ flows in the photodiode 210 and a voltage $V_D$ corresponding to the current is developed across the resistor 273. This voltage drop increases in proportion to the intensity of the interference illumination so that when the value of $V_D$ attains the threshold value voltage for the base-emitter section of the transistor 271, the transistor 271 is turned on and the resistor 274 is connected in parallel with the resistor 234, thus decreasing the load resistance value of the transistor 231. In this way, the voltage gain of the transistor 231 is decreased. While this embodiment has a design freedom in that the value of the resistor 273 may be suitably selected so as to turn on the transistor 271 at any desired point with respect to the intensity of interference illumination and that the amount of variation in the voltage gain of the transistor 231 can be controlled as desired by suitably selecting the value of the resistor 274 in relation to the resistor 234, the voltage gain can be controlled only to either of the two values. This is the same with the embodiment shown in FIG. 7.

Figure 9:
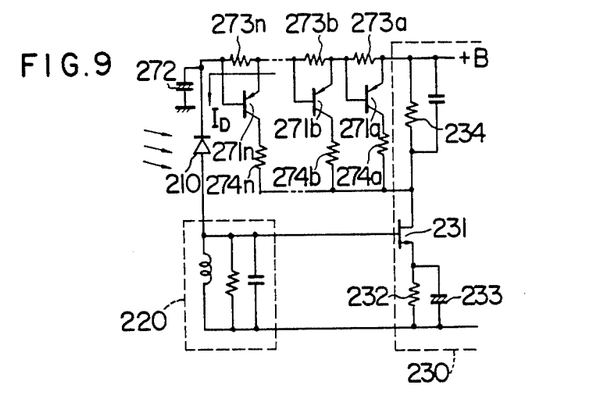
FIGS. 9, 10, 11 and 12 are circuit diagrams showing still other embodiments of the invention.
Figure 10:
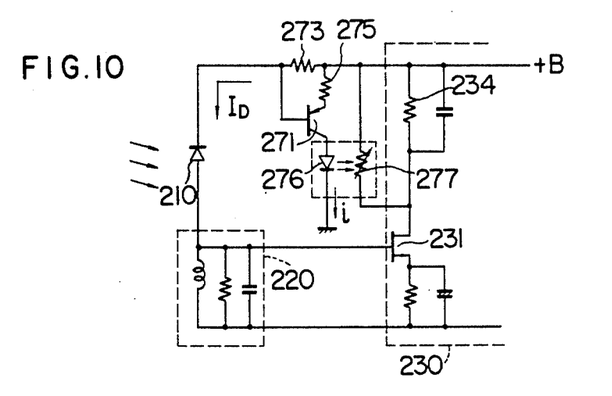

Another embodiments designed to improve on this point are shown in FIGS. 9 and 10. FIGS. 9 and 10 show only the voltage gain control sections which are different in construction from the counterpart of FIG. 7. In FIG. 9, numerals $271a$, $271b$, ---, $271n$ are transistors and $273a$, $273b$, ---, $273n$ and $274a$, $274b$, ---, $274n$ resistors. The collectors of the transistors $271a$, $271b$, ---, $271n$ are respectively connected through the resistors $274a$, $274b$, ---, $274n$ to the drain D of the transistor 231 in the AC amplifier 230. The resistors $273a$, $273b$, ---, $273n$ are respectively connected to the base-emitter section of the transistors $271a$, $271b$, ---, $271n$, and the resistors $273a$, $273b$, ---, $273n$ are connected in series with each other. One end of the series-connected resistors is connected to the power supply line and the other end is connected to the cathode of the photodiode 210.

Figure 8:
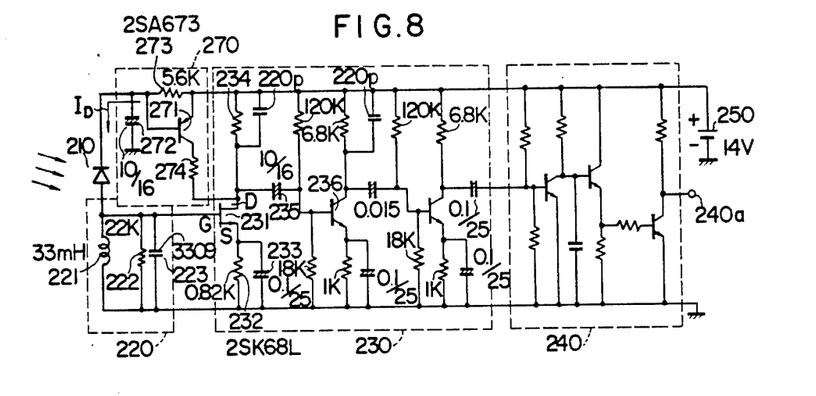
FIG. 8 is a circuit diagram for the embodiment of FIG. 6.

More specifically, the embodiment circuit shown in FIG. 9 comprises the plurality of voltage gain control circuits each corresponding to the circuit comprising the transistor 271 and the resistors 273 and 274 in the embodiment of FIG. 8 and these circuits are continuously controlled in accordance with the intensity of an interference illumination to vary the voltage gain of the transistor 271 in a stepwise manner. If the resistor $273b$ is selected smaller than the resistor $273a$ and the resistor $273n$ smaller than the resistor $273b$, the transistors $271a$, $271b$, ---, $271n$ will be turned on successively in accordance with the intensity of interference illumination and the resistors 274a, 274b, ---, 274n will be successively connected in parallel with the load resistor 234 of the transistor 231, thus controlling the voltage gain of the transistor 231 in a stepwise manner.

In FIG. 10, the base of the transistor 271 is connected to the cathode of the photodiode 210 and the base is also connected to the power supply line through the resistor 273. The transistor 271 has its emitter connected to the supply line through the resistor 275 and its collector grounded through the anode and cathode of a light emitting diode 276. Numeral 277 designates a variable resistance element disposed opposite to the light emitting diode 276 and connected in parallel with the load resistor 234. The variable resistance element 277 comprises a CdS device whose internal impedance varies with the intensity of the light from the light emitting diode 276 and it is photocoupled with the light emitting diode 276 to form a photocoupler circuit.

More specifically, in the circuit of the embodiment shown in FIG. 10 the value of the voltage developed across the resistor 273 is made proportional to the intensity of an interference illumination and the collector current of the transistor 271 or the current i in the light emitting diode 276 is continuously controlled to vary the luminous intensity of the light emitting diode 276 and thereby to vary the resistance value of the variable resistance element 277 to control the voltage gain of the transistor 231. In other words, in order to continuously control the voltage gain of the transistor 231 in response to the intensity of an interference illumination, the variable resistance element 277 comprising a CdS device or the like is connected in parallel with the resistor 234 and the resistance value of the variable resistance element 277 is controlled in accordance with the intensity of the interference illumination. While, in this embodiment, the variable resistance element comprises a CdS device, the CdS device may be replaced with any other variable resistance element such as a field effect transistor.

Figure 11:
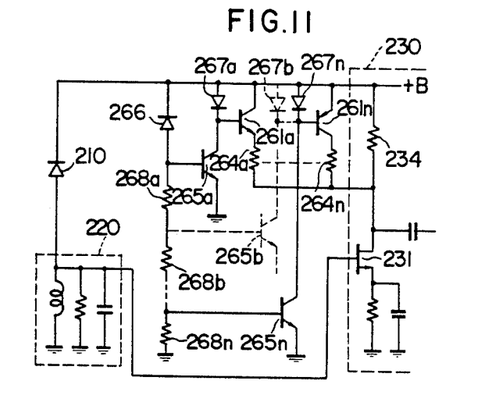
Figure 12:
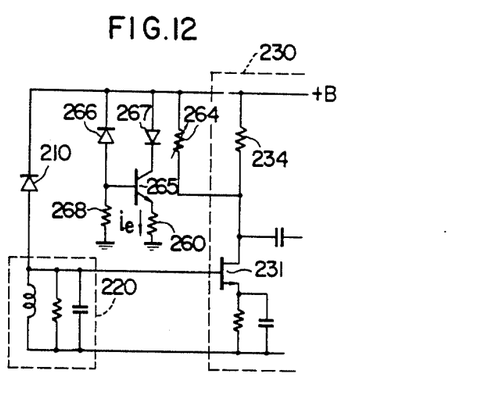

In order to utilize the embodiment of FIG. 7 to effect the gain control in a stepwise manner or in a successive manner in the similar way as the embodiment of FIG. 9 or 10, the circuit contstruction shown in FIG. 11 or 12 may be employed. More specifically, in the circuit of FIG. 11 in accordance with the intensity of an interference illumination transistors 265a, 265b, ---, 265n and transistors 261a, 261b, ---, 261n are turned on in this order and gain controlling resistors 264a to 264n are connected in this order in parallel with the load resistor 234 of the FET transistor 231. In the circuit of FIG. 12, a resistor 260 is connected to the emitter of the switching transistor 265 and the current $i_e$ flowing in the resistor 260 is varied continuously.

Figure 13:
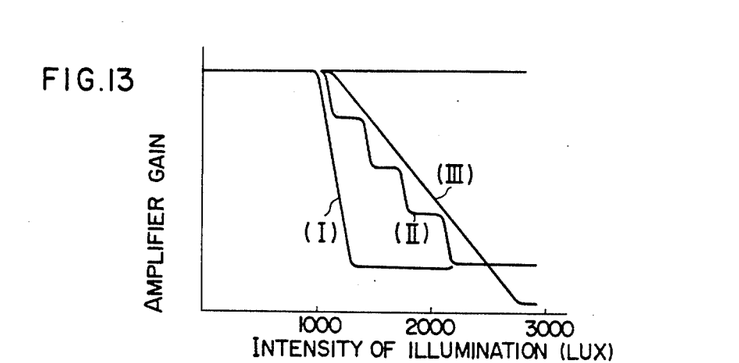
FIGS. 13 and 14 are characteristic diagrams useful for explaining the invention.
Figure 14:
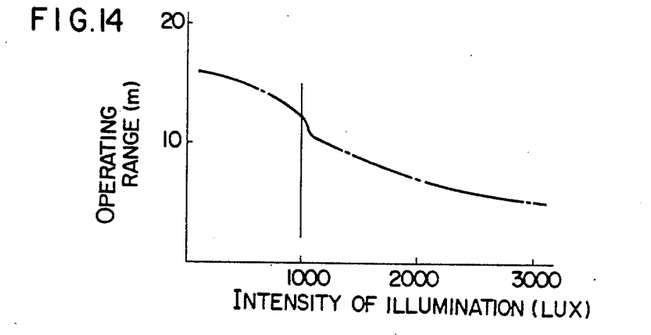

The operations of the embodiments shown in FIGS. 5 to 12 have been described so far and FIG. 13 shows the AC amplifier gain versus interference illumination characteristics of the circuits shown in the Figures. In FIG. 13 the characteristics (I) to (III) respectively correspond to the circuits shown in FIGS. 8, 9 and 10, respectively, and it will be seen that in the circuit of FIG. 9 the voltage gain was controlled in a stepwise manner in accordance with the intensity of the interference illumination and the voltage gain was controlled continuously by the circuit of FIG. 10. FIG. 14 shows the results of the actual measurement of the remote control range characteristic of a receiver utilizing the circuit construction of FIG. 8. The results relate to the case in which the circuit of FIG. 8 was designed so that with the transistor 271 turned off or without any interference illumination the voltage gain of the AC amplifier 230 was set to 86 dB and the transistor 271 was turned on in response to an interference illumination of over 1000 luxes so as to decrease the voltage gain to 80 dB, and it will be seen that there would be no sharp decrease in the range of remote control due to the interference illumination as was the case with the characteristic (I) of FIG. 4 and it is possible to ensure a satisfactory range. As will be seen from a comparison between the characteristic (I) of FIG. 4 and that of FIG. 14, in the case of the remote-controlled receiver according to the invention in which the intensity of an interference illumination is detected to automatically control the voltage gain of the AC amplifier, there is no possibility of causing a phenomenon of any sharp decrease in the range of remote control. This constitutes a great advantage in that the difficulty of the prior art system of FIG. 1 or the necessity to increase the range of remote control at the sacrifice of complicating the construction of the receiver can be overcome once for all.

We claim:

1. In an infrared remote-controlled receiver including light detecting means for receiving a remote control signal transmitted by an infrared radiation to generate a light signal corresponding to the intensity of said received signal, and an amplifier for amplifying the output light signal of said light detecting means, the improvement comprising circuit means connected to said amplifier to detect an ambient luminance of said receiver and control the gain of said amplifier in response to said detected ambient luminance of said receiver.

2. A remote-controlled receiver according to claim 1, wherein said circuit means comprises a light detecting circuit for generating a DC light current corresponding to said receiver ambient luminance, and at least one gain control circuit connected between said detecting circuit and said amplifier and operative in response to the DC light current from said light detecting circuit to control the gain of said amplifier.

3. A remote-controlled receiver according to claim 2, wherein said light detecting circuit comprises an interference illumination detecting light detecting element disposed in the vicinity of said light detecting means, and wherein said gain control circuit comprises DC light current detecting means connected to said interference illumination detecting light detecting element to detect a DC light current flowing in said interference illumination detecting light detecting element and corresponding to the intensity of an interference illumination light, switch means connected to said DC light current detecting means so as to be turned on when said detecting means detects a DC light current exceeding a predetermined value, and resistor means connected to said switch means and said amplifier whereby when said switch means is turned on a load resistance value of said amplifier is decreased and the gain of said amplifier is decreased.

4. A remote-controlled receiver according to claim 2, wherein said light detecting circuit comprises said light detecting means, and wherein said gain control circuit comprises DC light current detecting means connected to said light detecting means to detect a DC light current flowing in said light detecting means in response to an ambient luminance of said receiver, switch means connected to said DC light current detecting means so as to be turned on when said detecting means detects a DC light current exceeding a predetermined value, and resistor means connected to said switch means and said amplifier whereby when said switch means is turned on a load resistance value of said amplifier is decreased and the gain of said amplifier is decreased.

5. A remote-controlled receiver according to claim 2, wherein said light detecting circuit comprises said light detecting means, and wherein said gain control circuit comprises DC light current detecting means connected to said light detecting means to detect a DC light current flowing therein in response to an ambient luminance of said receiver, switch means connected to said DC light current detecting means so as to be turned on in response to the detection of a DC light current by said detecting means, light emitting means connected in series with said switch means to produce a light when said switch means is turned on, and photoelectric conversion means disposed opposite to said light emitting means and connected in parallel with a load resistor of said amplifier, said conversion means having a resistance value varying continuously in accordance with the intensity of the light produced by said light emitting means.

6. A remote-controlled receiver according to claim 2, wherein a plurality of said gain control circuits are connected in parallel with each other.

7. In an infrared remote-controlled receiver including light detecting means for receiving a remote control signal transmitted by an infrared radiation and an interference signal produced by an incandescent lamp light or the like to produce an AC light current and a DC light current which are respectively corresponding to the received intensity of said remote control signal and said interference signal, an amplifier for amplifying the AC light current produced by said light detecting means and a source of operating power, the improvement comprising gain control means for detecting the DC light current produced by said light detecting means to control the gain of said amplifier so as to decrease or increase the same in response to an increase or decrease in the intensity of said DC light current.

8. A remote-controlled receiver according to claim 7, wherein said gain control means comprises DC light current detecting means having a first resistor connected in series with said light detecting means and said power source to detect a DC light current flowing in said light detecting means, a second resistor having one end thereof connected to a load resistor of said amplifier, and a switching transistor connected to the other end of said second resistor and the ends of said first resistor of said DC light current detecting means whereby when a voltage drop is developed across said first resistor in response to said DC light current said switching transistor is turned on in response to said voltage drop to electrically connected said second resistor in parallel with said load resistor of said amplifier.

9. A remote-controlled receiver according to claim 7, wherein said gain control means comprises DC light current detecting means having at least series-connected first and second resistors connected in series with said light detecting means and said power source to detect a DC light current flowing in said light detecting means, at least third and fourth resistors having one ends thereof connected to a load resistor of said amplifier, a first switching transistor connected to the other end of said third resistor and the ends of said first resistor of said DC light current detecting means whereby when said DC light current produces across said first resistor a voltage drop reaching a first level value said first switching transistor is turned on in response to said first level value to electrically connect said third resistor in parallel with the load resistor of said amplifier, and a second switching transistor connected to the other end of said fourth resistor and the ends of said second resistor of said DC light current detecting means whereby when said DC light current produces across said second resistor a voltage drop reaching a second level value said second switching transistor is turned on in response to said second level value to electrically connect said fourth resistor in parallel with the load resistor of said amplifier.

10. A remote-controlled receiver according to claim 7, wherein said gain control means comprises DC light current detecting means having a first resistor connected in series with said light detecting means and said power source to detect a DC light current flowing in said light detecting means, a switching transistor connected to the ends of said first resistor of said DC light current detecting means so as to be turned on in response to the production of a voltage drop across said first resistor by said DC light current, light emitting means connected to said switching transistor to produce a light when said switching transistor is turned on, and photoelectric conversion means disposed opposite to said light emitting means and connected in parallel with a load resistor of said amplifier, said conversion means having a resistance value varying in accordance with the intensity of the light produced by said light emitting means.

* * * * *